Patented Mar. 4, 1952

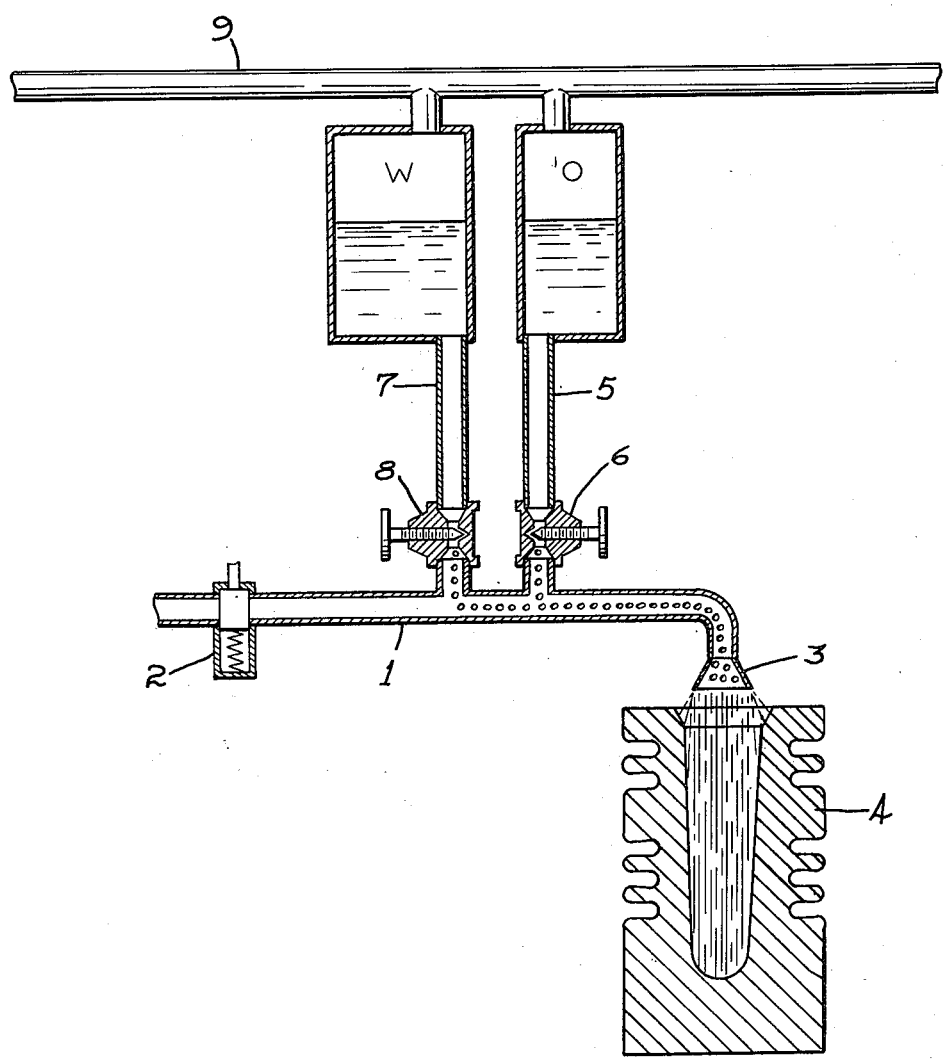

2,587,722

UNITED STATES PATENT OFFICE 2,587,722

TREATMENT OF MOLD SURFACES

Louis D. Garratt and George A. Breene,
Emlenton, Pa.

Application November 29, 1950, Serial No. 198,138

4 Claims. (Cl. 18—47)

Our invention or discovery relates to the treatment of mold surfaces and it is intended primarily for use in the glass industry although it may also be found useful in the molding of other materials.

The general object of the invention is to provide an improved process of treating mold surfaces during operation in a molding machine which will maintain a smooth even graphite film on the glass contacting surfaces, preventing the buildup of undesirable deposits of hard carbon or other material and at the same time providing the desired degree of cooling of the molds.

Before placing new molds into use, the glass industry has generally adopted the process of graphite plating of the mold surfaces described in Patent No. 2,246,463 issued June 17, 1941. While that process has been successful as a preliminary treatment many difficulties have been experienced in the subsequent treatment of the molds during operation in the molding machines. It is unnecessary here to describe the functions and advantages of the graphite coating on the mold surfaces, as they are well understood not only in the glass making industry but also in the metal molding art.

In the treatment of the molds while in use the graphite must be applied while the molds are at working temperature. While this may vary from 500° to 1200° F., in the glass industry it is more commonly 825° F. to 1100° F. The common practice has been to use for this purpose a compound the bulk of which consists of light paraffin base oil and containing colloidal graphite in suspension, which compound is further diluted with more mineral oil, in most cases in the glass factories. While a spray of oil carrying the graphite may be used at these temperatures, there are many important objections to the use of oil. It is used primarily as a carrier for the graphite and quickly volatilizes on the hot surfaces of the molds. The resulting cloud of smoke is not only very disagreeable to the operators but the partial condensation of the oil on the building structure presents a greatly increased fire hazard. As a result of the evaporation of so much oil there is a tendency for hard carbon deposits to build up on the mold surfaces thus producing inferior glassware and even more serious troubles. The storage of the necessary substantial quantities of oil is a nuisance in a glass factory and of course the cost of the oil is a considerable item.

Because of these objections to the use of oil, various attempts have been made to use a solution (or suspension) of graphite in water. While such a solution is useful in the preliminary treatment where the application is made at temperatures substantially lower than 500° F., it has not been found satisfactory for use during the subsequent treatment where the mold temperature is necessarily higher, usually over 825° F. This is due to the fact that the small drops of water striking the hot surface are converted into steam with almost explosive violence, carrying with it mechanically the graphite which had been in suspension in the water. Thus instead of adhering to the mold surface most of the graphite falls away and is wasted. Even attempts to spray the water and graphite through atomizers are unsatisfactory and the use of atomizers is highly objectionable due to clogging and other troubles. We have even tried to combine with the water solution some types of wetting agents and other materials without any degree of success.

During the course of our various experiments and tryouts we have discovered the herein described process, which appears to be an ideal solution of the problem. We are not certain that we know the full technical reasons why it produces such remarkably improved results, because it is difficult to ascertain precisely all that takes place on the surfaces of glass molds under all the varying conditions and materials. But the knowledge we have and which is herein disclosed will enable those skilled in the art to utilize the invention.

One departure which we have made from prior attempts is to arrange to supply the graphite in its best carrier, which is light mineral oil, from one source, and the water which increases the volume and spread of the spray, from another source and to conduct them from these separate sources to a single air line leading to the spray. Thus we are able to control the water and the graphite in oil separately and adjust them to meet varying conditions. Although water alone introduced in this manner will not suffice for reasons pointed out above, we have discovered that a mixture of soluble oil and water gives surprisingly good results and enables us to use a simple mechanism for controlling or metering the amount of material used. For convenience in the following description and in the appended claims, the soluble oil and water mixture will be referred to as the water mixture and the graphite solution or suspension in oil will be referred to as the oil solution. It will be understood that the oil solution contains a high concentration of colloidal graphite thus minimizing the above harmful effects of oil.

We shall now describe in detail, by way of illustration, one specific process which we have demonstrated in actual practice with great success. The accompanying drawing is a single figure which shows diagrammatically a part of a typical installation for utilizing our process. The supply of the water mixture is from tank W and the supply of the oil solution from tank O. Air under pressure flows through an air line 1 under the control of a suitable valve 2 which may be operated automatically in properly timed relation by the molding machine. The air line leads to a spray nozzle or outlet 3 which may be of any suitable design. Preferably we employ a nozzle capable of dispersing the liquid particles in finely divided form and of directing them as uniformly as possible over the surface of the mold. As an example of molds to which our process may apply there is indicated in the drawing a parison mold 4.

As closely adjacent to the spray nozzle as possible, the oil solution is introduced into the air line from the tank O through a suitable pipe connection 5, the flow being controlled in any suitable manner, such as by a sight feed, needle adjustable valve 6. The water solution is fed into the air line through a pipe connection 7, under the control of an adjustable valve 8, similar to the valve 6, and connects into the air line at a point close to the connection of line 5. It is thought that both the water mixture and the oil solution are picked up mechanically by the air spray mixing the two solutions so that the graphite may be distributed uniformly through the spray nozzle. Due to the fact that there is a backward pressure on the feed lines 5 and 7 it is usually desirable to keep the tanks W and O under a balancing pressure, which may be accomplished by connecting them to an air line 9 and having an air tight seal around the filler opening.

The air pressures employed may vary but in our work it has been approximately three pounds per square inch. The rate of feed of the water mixture and the oil solution will vary depending on conditions and size of the mold. In general, the volume of the water mixture will be three to six times the volume of the oil solution. As an example, the rate of feed of the concentrated oil solution may be one or more drops per minute as in the case of the 62 process, depending on size of the job being run.

The water mixture which we have successfully employed was made by using a mineral oil compound with a soluble oil base of either petroleum sulphonates or napthanates. This provides a soluble oil which is mixed with whatever proportion of water is practical for the job being run. In one typical instance we used one part soluble oil to fifty parts of water. We do not consider it practical to try to mix the colloidal graphite in this water solution since the graphite does not remain in suspension and at best would have to be constantly stirred. Also as above pointed out we have demonstrated important advantages in being able to control separately the water mixture and the oil solution.

In actual tests with the above process we have shown for the first time that a highly satisfactory graphite film may be maintained on the mold surfaces under various conditions without the necessity of employing objectionable quantities of oil. We have produced glassware with this process having an even better surface finish than was produced with graphite and oil alone and have maintained this finish over much longer periods of operation than was possible with the old process. We are able better to control the operating temperatures of the molds than ever before and at the same time maintain the high lustre smooth surfaces on the molds. For example, on hot days we can merely increase the volume of the water solution going into the molds thus giving a greater cooling effect. Under conditions where more graphite film buildup is required we can increase the volume of the oil solution without materially affecting the cooling effect.

One of the reasons, if not the chief reason, why we have been able to obtain these improved results is in the difference in character of the residue left on the mold surface upon evaporation. The residues from the soluble oil base apparently keep the film in a relatively softer state, thus creating a condition where new applications of graphite will more readily adhere to the surface instead of being swept away by evaporation of the water. We have demonstrated this condition by removing a mold from the machine operating with our process and finding that the mold surfaces can readily be cleaned with steel wool or a wire brush. Also we believe that the action of the water portion of the mixture, which of course rapidly escapes in the form of steam has a cleaning effect which prevents any objectionable buildup. The resultant effect is that there is a cleaning effect upon each spraying and at the same time there is a fresh coating of relatively soft graphite.

While we have herein specifically described one embodiment of our invention, other embodiments and variations may occur to those skilled in the art after a knowledge of the disclosure herein, and we desire to include within the scope of our patent all such embodiments and variations, and more particularly as comprehended by the appended claims.

What we claim as new and desire to secure by Letters Patent is:

1. A process of treating mold surfaces while at their operating temperature of between 500° F. and 1200° F. in a molding machine for cooling the molds and for depositing graphite on the mold surfaces, which comprises applying to the mold surfaces in the form of a finely divided spray the combination of a solution of colloidal graphite in oil and a mixture of soluble oil and water, such application being accomplished by introducing the oil solution and water mixture from separate sources into a conduit leading to the spray nozzle which directs the spray to the mold surfaces, and closely adjacent said nozzle, said conduit carrying a gaseous stream which mixes with the particles of the oil solution and water mixture, and carries them through the nozzle to the mold surfaces.

2. The process defined in claim 1 wherein the volume of the water mixture which is introduced into the conduit is from three to six times the volume of the oil solution.

3. A process of treating mold surfaces while at their operating temperature in a glass molding machine which may vary from 500° F. to 1200° F., which comprises conducting through valve controlled means a concentrated solution of graphite in oil into an air line closely adjacent a spray nozzle which directs the spray to the mold surfaces, conducting from a separate source through a second valve controlled means a mixture of soluble oil in water into said air line adjacent to the place where the oil solution is introduced into the air line, the air stream flowing through said air line serving to carry both said water mixture and said oil solution and eject them together in the form of a finely divided spray through said nozzle, whereby the volume of the water mixture and the volume of the oil solution are separately varied to meet different operating conditions, the water mixture percentage being increased when more cooling and cleaning are required and vice versa when more graphite film buildup is required.

4. The process as defined in claim 3 wherein said water mixture consists of a soluble oil base of either petroleum sulphonates or napthanates mixed with water, the proportion of the water to the oil base being of the order of fifty to one.

LOUIS D. GARRATT.
GEORGE A. BREENE.

REFERENCES CITED

The following references are of record in the file of this patent:

UNITED STATES PATENTS

| Number | Name | Date |
| --- | --- | --- |
| 1,693,923 | Hess | Dec. 4, 1928 |
| 2,246,463 | Garratt | June 17, 1941 |
| 2,410,422 | Breene et al. | Nov. 5, 1946 |

OTHER REFERENCES

"Colloidal Graphite and Its Uses in the Glass Industry," Glass Industry, vol. 26, No. 2, March, 1945, pp. 125-127, 151.